Dec. 6, 1955 J. NORDHEIM 2,725,853
TETHERING DEVICES
Filed July 5, 1952
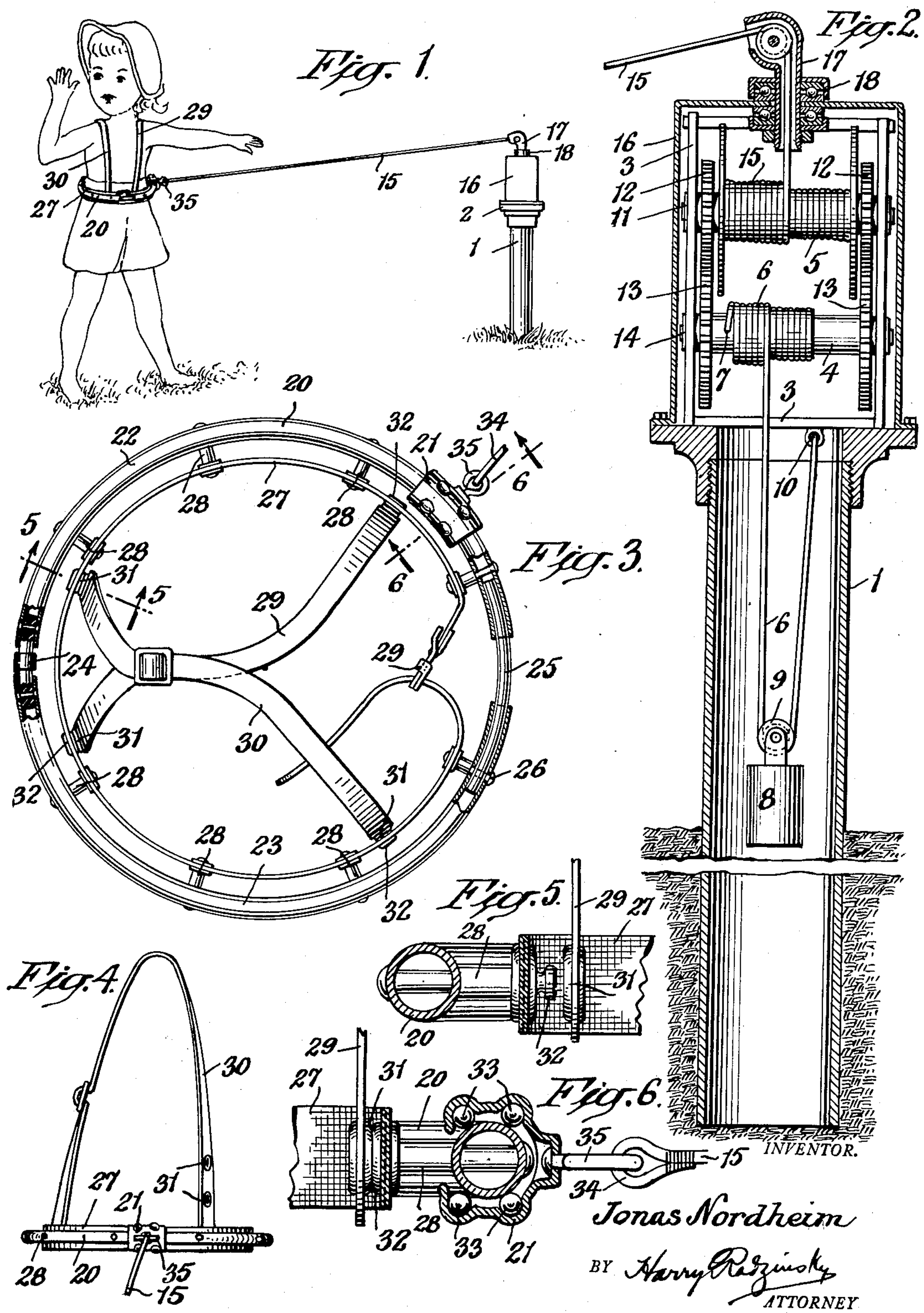
INVENTOR.
Jonas Nordheim
BY Harry Radzinsky
ATTORNEY

United States Patent Office 2,725,853
Patented Dec. 6, 1955

2,725,853

TETHERING DEVICES

Jonas Nordheim, New York, N. Y.

Application July 5, 1952, Serial No. 297,227
7 Claims. (Cl. 119—124)

This invention relates to tethering devices, such as are used for children, pets or small animals and by which the child or animal to which the device is attached will remain confined within a given area, yet be permitted to freely move about within such area.

One of the objections customarily encountered in tethering devices is the tendency of the tethering cord to become entangled, and when the cord is attached to a small child or animal, there is always the possibility that the cord might become constricted about the child or animal and cause injury and possibly death.

It is, therefore, one of the objects of the present invention to provide a tethering device in which the possibility of the child or animal becoming entangled in the cord will be prevented; in which a take-up device is provided by means of which the formation of slack in the tethering cord will be eliminated.

It is another object of the invention to provide a means for attaching a tethering cord to the body of a child in a manner to permit free movement of the attached end of the cord in a circle around the body of the child, so that the possibility of the child becoming wrapped up or entangled in the tethering cord will be effectively prevented.

More particularly, the invention contemplates the provision of a post or standard carrying a take-up drum on which the tethering cord is wound, said drum being coupled by gear means to a weight, operating to maintain the drum under rotative thrust to thereby tend to cause the drum to rotate in a manner to take up any slack which might tend to occur in the tethering cord. The invention further contemplates the attachment of one end of the tethering cord to a belt or harness fitted on the body of the child, which belt or harness receives the end of the tethering cord in a manner to permit the cord to rotate completely around the body of the child during movements of the child, whereby the cord will be effectively prevented from becoming wrapped about the body of the child.

With these and other objects to be hereinafter disclosed in view, I have devised the arrangement of parts to be described and more particularly pointed out in the claims appended hereto.

In the accompanying drawing, wherein an illustrative embodiment of the invention is shown, Fig. 1 is a perspective view showing the manner in which the device appears when in use;

Fig. 2 is a vertical sectional view taken through the tethering post;

Fig. 3 is a top plan view of the harness;

Fig. 4 is a side elevation of the same on a reduced scale;

Fig. 5 is a sectional view taken on the line 5—5 of Fig. 3, looking in the direction of the arrows; and Fig. 6 is a sectional view taken substantially on the line 6—6 of Fig. 3, looking in the direction of the arrows.

In Fig. 3 is shown the tethering post and the parts associated therewith. The main, or body portion of the post consists of a tubular upright 1 which is adapted to be firmly and fixedly supported in a vertical position in any suitable manner, such as by having its lower end portion firmly embedded in the ground or otherwise securely fastened so that the post will remain in a vertical position and be immovable. At the top, the hollow tubular portion 1 is provided with an annular flange 2 which acts as a supporting base for a frame 3 extending across the flange and in which a pulley 4 and a drum 5 are rotatively mounted. The pulley 4 receives a cable 6 which has one end 7 fastened to the pulley. The cable 6 unwinds from the pulley 4 by the urge of a weight 8 located within the tubular post 1 and movable up and down therein. The weight 8 is provided at the top with a pulley 9 under which the cable 6 extends, the second end of the cable being secured to an eye 10 fastened to the frame 3. This arrangement is such that the weight constantly applies a downward pull on the cable 8, tending to normally cause the same to unwind from the pulley 4.

The drum 5 is located above the pulley 4, and said drum includes a shaft 11, and adjacent to the opposite ends of the shaft 11 are secured relatively small gears or pinions indicated at 12. These pinions 12 are maintained in mesh with larger gears 13 secured on the shaft 14 of the pulley 4. This arrangement is such that relatively small rotative movement of the pulley 5 will occur during substantially rotative movement of the drum 5. The tethering cord 15 has one end secured to the drum 5 and is wound about the drum in the manner clearly shown in Fig. 2. When the tethering cord is rapidly drawn from the drum 5, as a child or animal to whom the free end of the cord is attached will move away from the post, and the drum 5 will rotate to permit the unwinding of the tethering cord from it, the pulley 4 will rotate very slowly due to the relative ratio between the gears 12 and 13. Thus, the post 1 need not be of very great height, yet the tethering cord can be of substantial length to permit the child or animal free movement within a large area, if desired.

The pulley 4, drum 5, gears 12 and 13 and bracket 3 are all enclosed by a housing or cover 16 so that the child cannot reach the operating parts of the device. The tethering cord 15 extends upwardly from the drum 5 through a hooded guide sleeve 17 in the top of the housing 16, said guide sleeve being mounted for free rotative movement by means of the ball-bearings 18.

The harness for attachment to the child or animal is shown in Figs. 3 to 6 inclusive. Said harness includes a ring or annulus 20 which might be composed of lightweight metal or of plastic material. Said ring constitutes a circular rail on which a traveller 21 is adapted to move in a manner to completely encircle the body of the child during movement of the child while tethered. The ring or annulus 20 is composed of two arcuate sections, indicated respectively at 22 and 23, these parts being flexibly or hingedly connected by the flexible insert shown at 24. Diametrically opposite to the insert 24 is a reduced-diameter insert 25 secured to the ring section 23 by the fastening pin or rivet 26. Said insert 25 is adapted to telescopically fit within the ring section 22 to an extent required to enable the ring 20 to fit with relative snugness about the waist of a child.

Provided within the ring 20 is a flexible belt 27 of webbing or leather which is spaced inwardly of the ring 20 by means of separators 28 to which the belt is attached. The belt 27 adapted to be fitted snugly around the waist of the child and the ends of the belt are joined together in the desired adjusted relation by a conventional buckle fastening indicated at 29.

For suspending the harness on the body of the child, shoulder suspension straps 29, 30 are provided, these straps fitting over the shoulders of the child in the manner of trouser-supporting suspenders and holding the ring 22 at waist level. The lower ends of each of the suspension straps 29 and 30 are each provided with several snap fastener elements 31, shown in Fig. 4, and such fastener elements are adapted for selective detachable engagement with complementary fastener elements 32 provided on the waist band or belt 27 to thereby hold the ring and attached belt 27 at the right height on the individual child.

The traveller 21, which travels in a complete circle around the waist of the child, is of substantially C-shape as clearly seen in Fig. 3, and it houses a plurality of balls 33 or other anti-friction elements which ride on the ring or rail 20 and allow the traveller to freely move along the rail during movements of the child. The free end 34 of the tethering cord 15 may be attached to the traveller 21 by any suitable means, such as by being engaged with a loop or eye 35 rotatably secured to the traveller.

From the foregoing, the operation of the tethering device will be readily understood. When it is desired to restrain a child or animal within the limits permitted by the length of the tethering cord 15, the harness is fitted on the child as shown in Fig. 1. That is to say, the ring sections 22 and 23 may be spread apart on the flexible connection or hinge joint 24 by drawing the part 25 out of the ring section 22. The ring is thus spread open and with the belt open the ring and belt may be then readily placed around the waist of the child. The belt is now tightened to comfortably fit the child and the ring 20 thus encircles the body of the child about the waist while the suspension straps 29 and 30 support the ring 20 at the proper height. The child is now free to run about and play unrestrainedly within the limits of the tethering cord 15. Since the tethering cord extends through the rotative guide tube 17, the cord is capable of permitting movement of the child within a complete circle around the tethering post 1. Also since the traveller 21, to which the free end of the tethering cord 15 is attached, is capable of movement through a complete circle on the ring 20 completely around the waist of the child, the possibility of the child causing the cord to take one or more turns around his or her body is prevented and exceptional freedom of movement on the part of the child, within the limits of the tethering cord, is permitted.

With the weight 8 constantly imparting a downward pull on the take-up cable 6, the pulley 4 will constantly cause any slack in the tethering cord to be taken up and wound on the drum 5. Thus, there will never be any slack in the tethering cord to lie on the ground, and in which the child might possibly become entangled while running about.

While I have shown one embodiment of the invention, it is obvious that changes may be readily made in the same without departing from the spirit of the invention. For example, while I have herein shown the harness of Fig. 3 as being adapted for attachment to a tethering cord secured to the take-up device of Fig. 1, it will be apparent that a harness of the kind described might be used while taking a child walking, the tethering cord in such case becoming a leader or leash that is held in the hand. The manner of constructing the rail or ring 20, the belt and suspension means attached thereto and other elements of the device might also be materially changed as is contemplated by the scope of the claims appended hereto.

What I claim is:

1. A tethering device comprising a hollow post, a drum rotatively mounted at the top of the post, a tethering cord attached at one end to the drum and adapted to be wound upon the drum, a pulley carrying a weighted cable, the weight for said cable being located within the hollow post and movable up and down within said post, a gear carried by the pulley, a gear carried by the drum, the gears being in mesh in a manner to cause rotative movement of the drum when the pulley is rotated by descent of the weight, a harness for fitment on the body of a child, a coupling between one end of the tethering cord and said harness in a manner to enable the said end of the tethering cord to travel completely around the body of a child wearing the harness, and cord-guiding means on the post permitting the cord to be swung in a complete circle with the post as its axis.

2. In a tethering device, a belt for fitment around the body of a child, said belt including a single circular rail encircling the body of the child, a tethering cord provided at one end with a non-circular element movably engaging said rail in a manner to permit the cord to pursue a circular path defined by the rail to thereby enable the end of the tethering cord to travel completely around the body of a child wearing the belt.

3. A tethering device including a belt for fitment on the body of a child, said belt including a single circular rail, a tethering cord having a traveller at one end, the traveller engaging the rail and capable of complete encirclement of the body of the child wearing the belt, a post, a drum mounted thereon, the tethering cord being wound on the drum, and a counter-weighting means operative on the drum to rotate the same and take up slack in the tethering cord.

4. A tethering device comprising, a hollow post, a pulley rotative at the top of the post, a cable wound on the pulley, a weight engaged with the cable and tending to rotate the pulley in one direction, a drum mounted for rotative movement above the pulley, a gear carried by the pulley, a gear carried by the drum and in mesh with the gear carried by the pulley, a tethering cord having one end attached to the drum, a belt for attachment to the body of a child, the second end of the tethering cord being attached to said belt.

5. In a tethering device, a harness comprising a circular ring adapted to fit around the waist of a child, said ring being composed of a plurality of arcuate sections, means by which the sections may be separated to enable the ring to be fitted in position about the waist of the child, a flexible belt located within the ring, means for holding the belt spaced inwardly of the ring, suspension means attached to the belt for suspending the same from the shoulders, a traveller mounted on the ring and movable thereon for the entire length of the ring, and a tethering cord having one end attached to said traveller.

6. In a tethering device, a tethering post having a tubular body, a support at the top of the same, a frame mounted on said support, a drum rotatively mounted in said frame, a pulley rotatively mounted in the frame below the drum, a small gear carried by the drum, a larger gear carried by the pulley and meshed with the gear carried by the drum, a take-up cable wound on the pulley and looped downwardly within the tubular body, a weight suspended on said looped portion of the cable within the tubular body, the cable having an end secured within the tubular body adjacent to the upper end of the same, a tethering cord wound on the drum, a housing covering the drum and the pulley and the gears respectively carried by the drum and pulley, a rotatable guide sleeve mounted at the top of the housing and rotative about a vertical axis, the tethering cord being extended through said guide sleeve, and means at the free end of said tethering cord for attaching it to a child or animal.

7. A device of the character described comprising a fixed vertical post housing a flexible cord, take-up means within the post tending to draw the cord toward the post, guiding means on the post for the cord, said guiding means having rotative movement to enable the cord to be moved in a circle with the post as its axis, a loop member at the end of the cord for fitment about a child, a connection between the end of the cord and the loop member permitting the cord to move in a completely circular path around the loop member, the described arrangement of parts being such as to enable the child around whom the loop member is fitted to move to or from the post, to move in a complete circle around the post and to rotate in a complete circle at the end of the cord without entanglement of the cord and while the cord is maintained slack-free.

References Cited in the file of this patent

UNITED STATES PATENTS

| | | |
|---|---|---|
| 458,938 | Bloomfield | Sept. 1, 1891 |
| 476,726 | Bradley | June 7, 1892 |
| 1,107,445 | Powers | Aug. 18, 1914 |
| 1,738,581 | Hodgson | Dec. 10, 1929 |
| 2,212,746 | Nunn | Aug. 27, 1940 |
| 2,424,368 | Oberdorf et al. | July 22, 1947 |
| 2,481,559 | Ashbaugh | Sept. 13, 1949 |
| 2,496,748 | Pond | Feb. 7, 1950 |
| 2,553,007 | Rosenthal | May 15, 1951 |

FOREIGN PATENTS

| | | |
|---|---|---|
| 383,450 | Great Britain | Nov. 17, 1932 |
| 700,022 | Germany | Dec. 11, 1940 |